United States Patent
Yamada et al.

(10) Patent No.: US 9,128,359 B2
(45) Date of Patent: Sep. 8, 2015

(54) ELECTRONIC DEVICE AND IMAGE PROJECTION APPARATUS

(71) Applicants: Masamichi Yamada, Kanagawa (JP); Hideo Namba, Kanagawa (JP); Satoshi Tsuchiya, Kanagawa (JP); Yasunari Mikutsu, Tokyo (JP); Hideo Kanai, Tokyo (JP); Naoyuki Ishikawa, Kanagawa (JP); Motohisa Ikeda, Tokyo (JP)

(72) Inventors: Masamichi Yamada, Kanagawa (JP); Hideo Namba, Kanagawa (JP); Satoshi Tsuchiya, Kanagawa (JP); Yasunari Mikutsu, Tokyo (JP); Hideo Kanai, Tokyo (JP); Naoyuki Ishikawa, Kanagawa (JP); Motohisa Ikeda, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 179 days.

(21) Appl. No.: 13/974,408

(22) Filed: Aug. 23, 2013

(65) Prior Publication Data

US 2014/0072158 A1 Mar. 13, 2014

(30) Foreign Application Priority Data

Sep. 10, 2012 (JP) ................................. 2012-198928

(51) Int. Cl.
*G03B 21/14* (2006.01)
*H04R 1/02* (2006.01)

(52) U.S. Cl.
CPC ............... *G03B 21/14* (2013.01); *H04R 1/025* (2013.01); *H04R 1/028* (2013.01); *H04R 2499/15* (2013.01)

(58) Field of Classification Search
CPC ...... H04R 1/028; H04R 2499/15; H04R 1/02; H04R 2201/023; H04R 2499/11; H04R 1/025; H04R 2420/07
USPC ............................................................ 381/333
See application file for complete search history.

(56) References Cited

U.S. PATENT DOCUMENTS

| | | | | |
|---|---|---|---|---|
| 7,817,813 B2* | 10/2010 | Kang et al. | .................... | 381/333 |
| 7,953,242 B2* | 5/2011 | Soga | ............................. | 381/388 |
| 8,538,046 B2* | 9/2013 | Chen | ............................. | 381/182 |
| 2003/0059077 A1* | 3/2003 | Kambe | ......................... | 381/333 |

FOREIGN PATENT DOCUMENTS

| | | |
|---|---|---|
| JP | 04-048793 | 2/1992 |
| JP | 08-116582 | 5/1996 |
| JP | 10-066179 | 3/1998 |
| JP | 2011-160319 | 8/2011 |
| JP | 2012-054814 | 3/2012 |

* cited by examiner

*Primary Examiner* — Mark Blouin
(74) *Attorney, Agent, or Firm* — Oblon, McClelland, Maier & Neustadt, L.L.P.

(57) ABSTRACT

An electronic device includes a speaker; a speaker holder that holds the speaker; a main unit on which the speaker holder is mounted; a first mounting part formed on the speaker; a second mounting part formed on the speaker holder; a first elastic part that engages with both the first and second mounting parts; a third mounting part formed on the speaker holder; a fourth mounting part formed on the main unit; and a second elastic part that engages with both the third and fourth mounting parts. The speaker and the main unit are provided in such a manner as not to come into contact with each other under the condition that the first and second mounting parts engage with the first elastic part, and the third and fourth mounting parts engage with the second elastic part.

8 Claims, 10 Drawing Sheets

ELECTRONIC DEVICE AND IMAGE PROJECTION APPARATUS

CROSS-REFERENCE TO RELATED APPLICATIONS

The present application claims priority to and incorporates by reference the entire contents of Japanese Patent Application No. 2012-198928 filed in Japan on Sep. 10, 2012.

BACKGROUND OF THE INVENTION

1. Field of the Invention

The present invention relates to an electronic device and an image projection apparatus.

2. Description of the Related Art

Image projection apparatuses have been known that generate an image for projection using light output from a light source based on image data transmitted from a personal computer or a video camera, and project the generated image for display onto a projection surface such as a screen. In such an image projection apparatus, it is desired that images can be projected large-sized, and that the distance between the image projection apparatus and the projection surface can be set as short as possible. Image projection apparatuses have been disclosed that adopt a short projection distance.

In such an image projection apparatus, a speaker is provided for outputting various types of operation sounds and an alarm sound for users. For example, in Japanese Laid-open Patent Publication No. 10-066179, an installation mechanism of the speaker is disclosed, in which a speaker unit is supported at its flange portion by a housing of an electronic device with a vibration absorbing member interposed therebetween. The vibration absorbing member includes a holder mounted on and inserted into an installation flange of the speaker unit, and a mounting part integrally formed on the holder and fixed to the housing of the electronic device. While the installation flange of the speaker unit is held by the holder, the mounting part is fixed to the housing of the electronic device by a screw.

Japanese Laid-open Patent Publication No. 08-116582 discloses a speaker fixing structure including a contact surface, a holding unit, and an elastic member. The contact surface makes the front part of the speaker come in contact with a supporting member made of synthetic resin. The holding unit engages with and holds a part of the speaker. The elastic member makes the speaker held by the holding unit bring into elastically contact with the contact surface.

With the structure in which the speaker is fixed with a screw to the housing of the electronic device with a vibration absorbing member interposed therebetween as described above, however, the vibration of the speaker transmitted to the housing of the electronic device cannot be completely prevented. The vibration absorbing member and the housing of the electronic device engage with each other with the screw, that is, they are rigidly connected together. A certain amount of vibration of the vibration transmitted from the speaker to the vibration absorbing member is thus transmitted to the housing of the electronic device although reduced to some extent. Especially when the housing of the electronic device serves as the housing of an image projection apparatus such as a projector, the vibration is finally transmitted to the projected images. This may cause a failure that when the volume of the speaker is increased, the projected images vibrate and generate poor visibility.

Therefore, there is a need for an electronic device and an image projection apparatus that are capable of suppressing vibration caused by a speaker.

SUMMARY OF THE INVENTION

According to an embodiment, there is provided an electronic device that includes a speaker; a speaker holder that holds the speaker; a main unit on which the speaker holder is mounted; a first mounting part formed on the speaker; a second mounting part formed on the speaker holder; a first elastic part that engages with both the first mounting part and the second mounting part; a third mounting part formed on the speaker holder; a fourth mounting part formed on the main unit; and a second elastic part that engages with both the third mounting part and the fourth mounting part. The speaker and the main unit are provided in such a manner as not to come into contact with each other under the condition that the first mounting part and the second mounting part engage with the first elastic part, and the third mounting part and the fourth mounting part engage with the second elastic part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
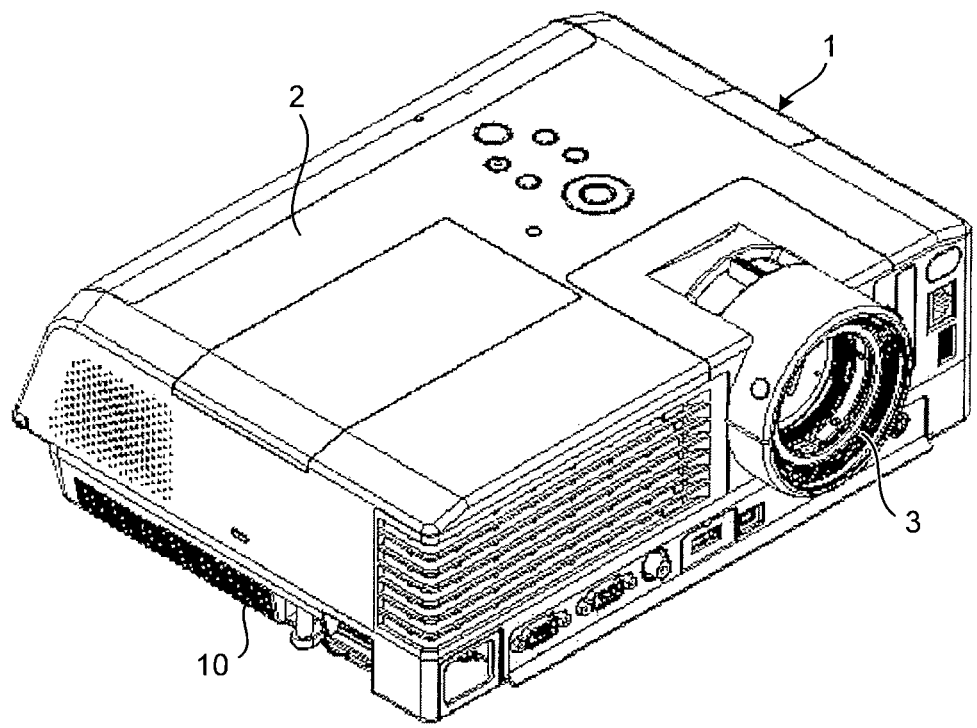
FIG. 1 is a perspective view of a projector according to an embodiment of the present invention.

An embodiment will be described in which an electronic device of the present invention is applied to a projector (an image projection apparatus) with reference to the accompanying drawings. The present invention can also be applied to other electronic devices that include a speaker and need suppression of vibration of the speaker, such as a personal computer and a television set. FIG. 1 is a perspective view of a projector 1 and FIG. 2 is a perspective view of the projector 1 in a state in which an upper cover 2 is removed.

Figure 2:
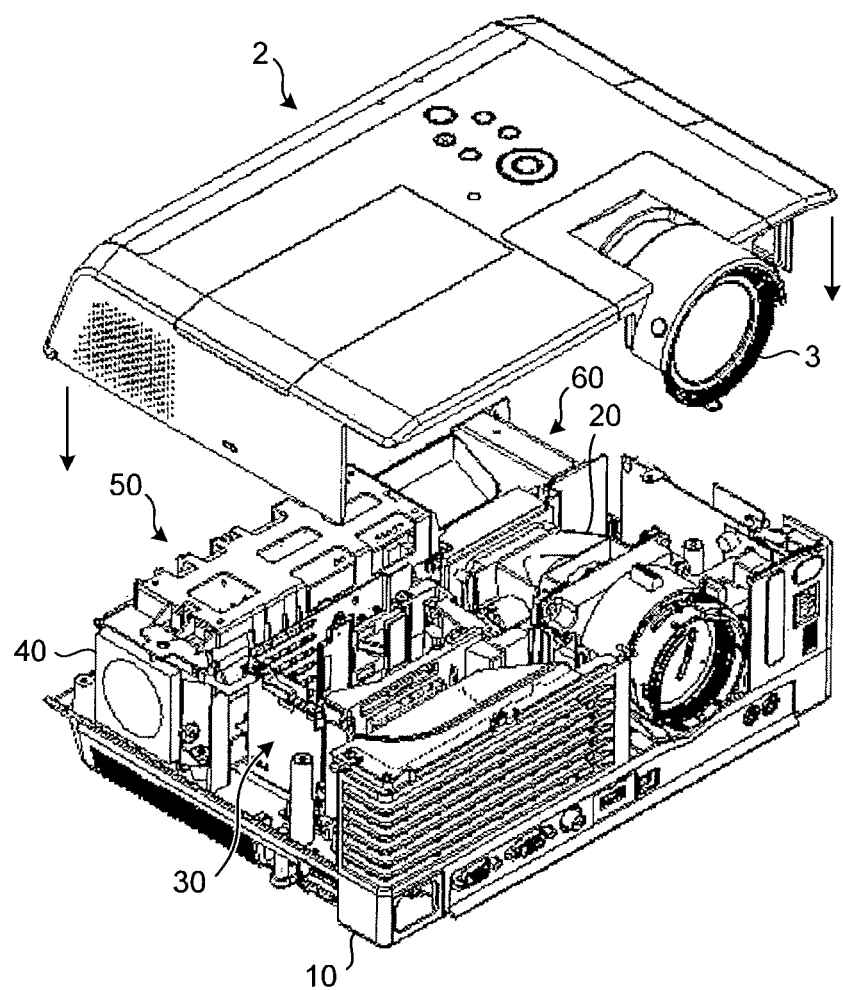
FIG. 2 is a perspective view of the projector according to the embodiment in a state in which an upper cover is removed.

As illustrated in FIGS. 1 and 2, a projector lens 3 is provided on the upper cover 2. The projector lens 3 is capable of changing magnification of image data finally projected on a projection surface. In a main unit 10 included in the housing of the projector 1, an optical device 20, a light source device 30, a speaker unit 40, a housing unit 50, and an air inlet 60 are provided.

Figure 3:
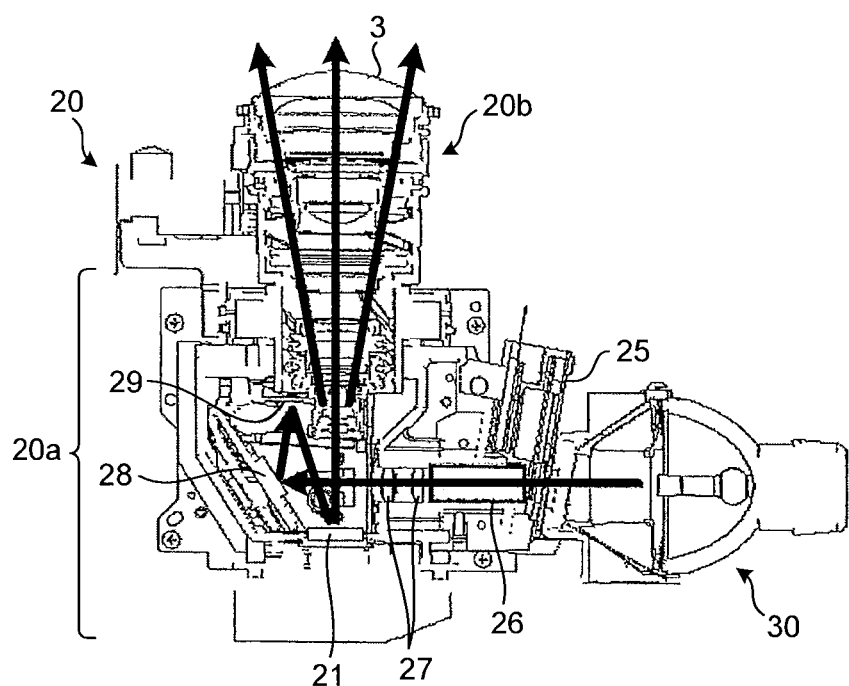
FIG. 3 is a cross-sectional view of an optical device and a light source device according to the embodiment.
Figure 3:
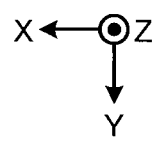

FIG. 3 is a cross-sectional view illustrating the detailed structure of the optical device 20 and the light source device 30. As illustrated in FIG. 3, the optical device 20 includes an illumination mechanism 20a and a projecting mechanism 20b. The main unit of the optical device 20 includes a color wheel 25, a light tunnel 26, a relay lens 27, a plane mirror 28, and a concave mirror 29. Each of these members is provided inside the body of the optical device 20. The optical device 20 also includes an image forming unit 21. The image forming unit 21 includes digital micromirror devices (DMDs) serving as an image forming device that forms images.

The color wheel 25 in a disk shape converts white light emitted from the light source device 30 into lights of red, green, and blue repeatedly in a certain unit of time and outputs the light to the light tunnel 26. The light tunnel 26 has a tubular structure made of a plurality of glass plates bonded to each other, and outputs the light emitted from the color wheel 25 to the relay lens 27. The relay lens 27 includes two lenses combined with each other, and concentrates the light output from the light tunnel 26 while correcting the axial chromatic aberration of the light. The plane mirror 28 and the concave mirror 29 reflect the light output from the relay lens 27 and guide the light to the image forming unit 21, thereby concentrating the light. The image forming unit 21 includes digital micromirror devices (DMDs) having a rectangular surface formed with a plurality of micromirrors driven in a time-division manner based on data of a moving image or a still image. The DMDs process and reflect the projected light so that predetermined image data is formed.

The light source device 30 includes a high pressure mercury lamp as a light source. The light source device 30 irradiates the illumination mechanism 20a of the optical device 20 with white light. In the illumination mechanism 20a, the white light emitted from the light source device 30 is divided into red, green, and blue lights (RGB) and guided to the image forming unit 21. The image forming unit 21 forms images according to a modulation signal and the projecting mechanism 20b magnifies the formed image and projects the magnified image.

An OFF light plate is provided in an upper portion in the vertical direction of the image forming unit 21, that is, on the near side in FIG. 3. The OFF light plate receives unwanted light not used as a projected light L out of the light entering the image forming unit 21. When light enters the image forming unit 21, a plurality of micromirrors are activated by operations of the DMD in a time-division manner based on moving image data. The micromirrors reflect the light in use to the projector lens 3 and reflect the light to be discarded to the OFF light plate. In the image forming unit 21, the light used for a projected image is reflected to the projecting mechanism 20b, magnified through the projector lenses 3, whereby the magnified image light is projected.

Figure 4A:
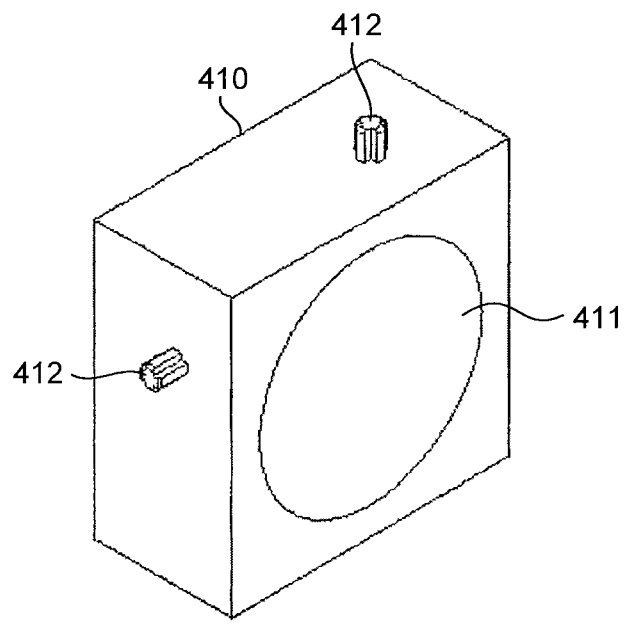
FIGS. 4A and 4B are perspective views of a speaker according to the embodiment.
Figure 4B:
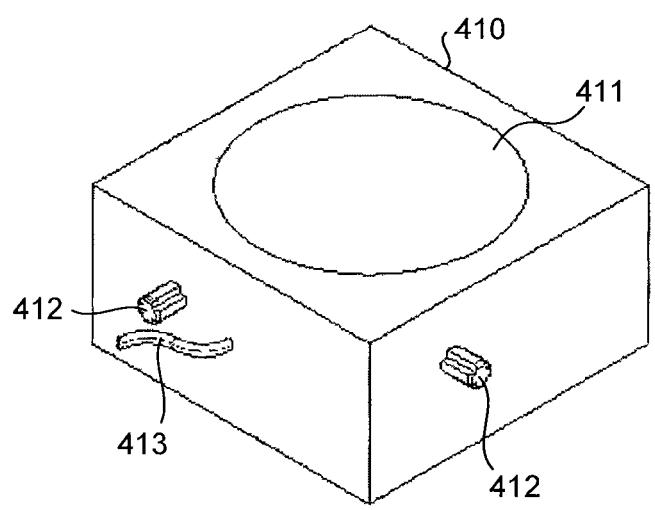

Next, the structure of the speaker unit 40 according to the embodiment will be described in detail. The speaker unit 40 is structured so that a speaker holder 420 holds a speaker 410. FIGS. 4A and 4B are perspective views of the speaker 410 viewed from different directions and FIGS. 5A and 5B are perspective views of the speaker holder 420 viewed from different directions.

As illustrated in FIGS. 4A and 4B, the speaker 410 includes a speaker vibration surface 411, four bosses 412 each serving as a first mounting part, and a harness 413. The speaker vibration surface 411 is a part from which sound from the speaker 410 is output. The respective bosses 412 extend nearly vertical from the four side surfaces of the speaker 410. The harness 413 is a wire that supplies electrical power to the speaker 410. The positions where the bosses 412 are formed will be described later.

Figure 5A:
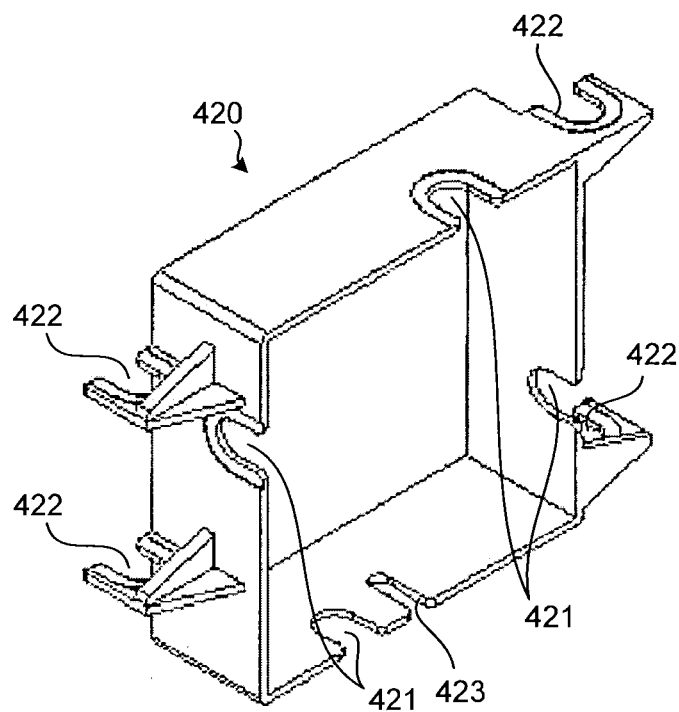
FIGS. 5A and 5B are perspective views of a speaker holder according to the embodiment.
Figure 5B:
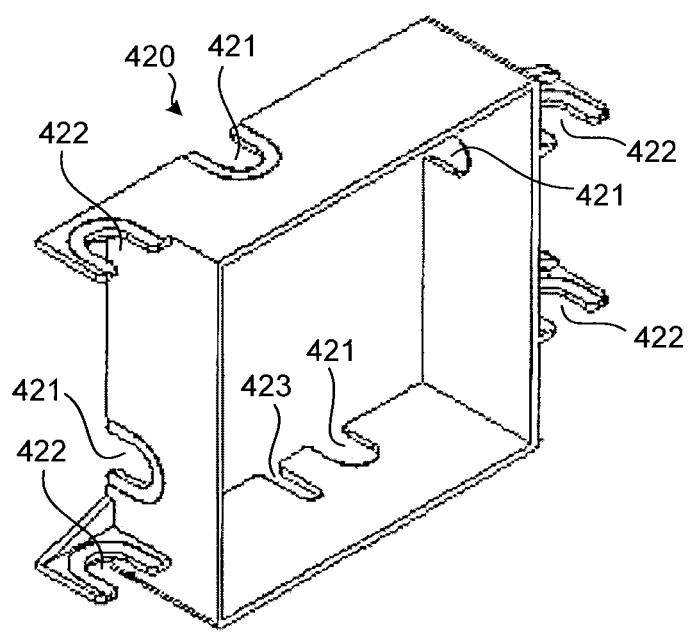

As illustrated in FIGS. 5A and 5B, the following are formed in the speaker holder 420: four first slits 421 each serving as a second mounting part, and four second slits 422 each serving as a third mounting part. The first slits 421 and the second slits 422 are U-shaped slits that fit to the shape of the elastic member described later. The first slits 421 are formed in the four side surfaces, i.e., the up and down, right and left side surfaces of the speaker holder 420. The positions where the first slits 421 are formed correspond to the positions of the bosses 412 formed on the speaker 410. The first slit 421 and the second slits 422 open in opposite directions from each other and are formed in a direction parallel to the direction the sound is output from the speaker 410 (i.e., perpendicular to the speaker vibration surface 411). By forming the slits in such a manner, the speaker 410 can be supported more rigidly against the vibrations in both the front direction and the back direction. The second slits 422 are formed in the parts protruding from the right and left surfaces of the speaker holder 420 as illustrated in FIGS. 5A and 5B.

A harness slit 423 is formed in the speaker holder 420. The harness slit 423 is used for guiding the harness 413 of the speaker 410. One of the first slits 421 formed adjacent to the harness slit 423 and another one of the first slits 421 on the opposite side are formed at point-symmetric positions to each other with respect to a central point of the line that passes through the harness slit 423 in the speaker holder 420.

Figure 6:
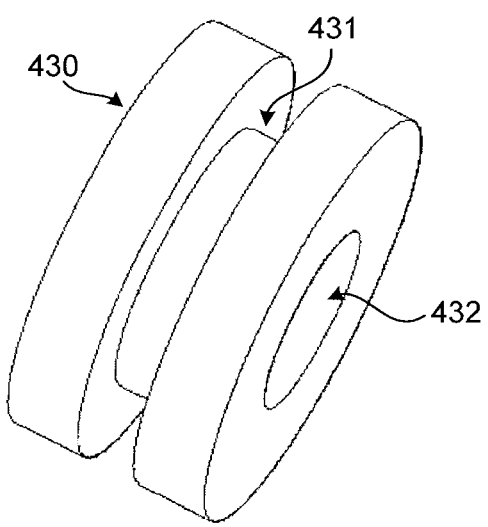
FIG. 6 is a perspective view of an elastic part according to the embodiment.

FIG. 6 is a perspective view illustrating the structure of an elastic part that engages with the mounting parts. As illustrated in FIG. 6, an elastic part 430 serving as a first elastic part and a second elastic part includes a groove 431 and a hole 432. The groove 431 is formed along the circumferential direction on the outer circumferential surface of the cylindrical body of the elastic part 430, and the hole 432 is formed along the central axis of the cylindrical body of the elastic part 430. The groove 431 is formed preferably on the center in the height direction of the cylindrical body of the elastic part 430. The elastic part 430 is made of a material with a high vibration absorption property such as a chloroprene rubber and a sponge.

Figure 7A:
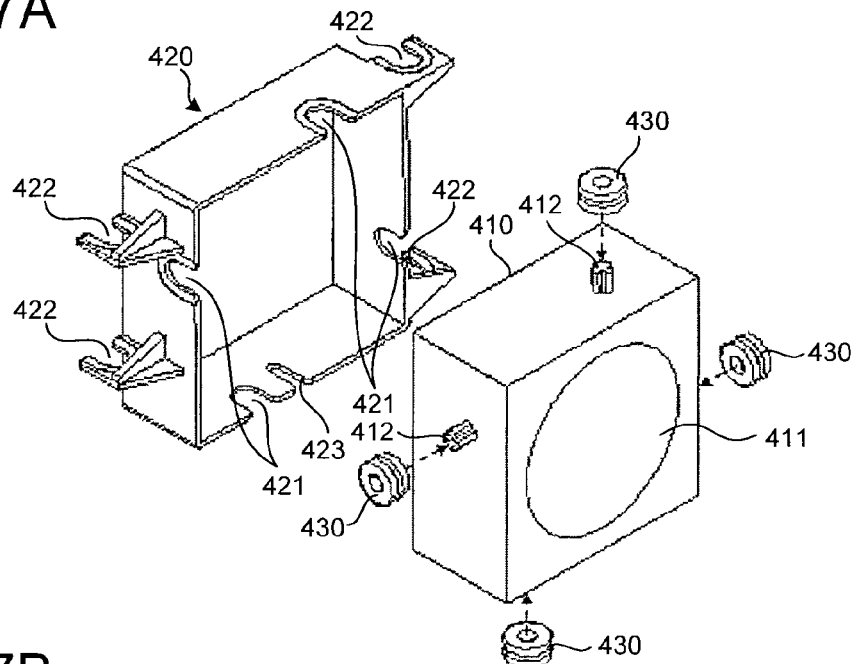
FIGS. 7A to 7C are diagrams for explaining the order in which a speaker unit is assembled according to the embodiment.
Figure 7B:
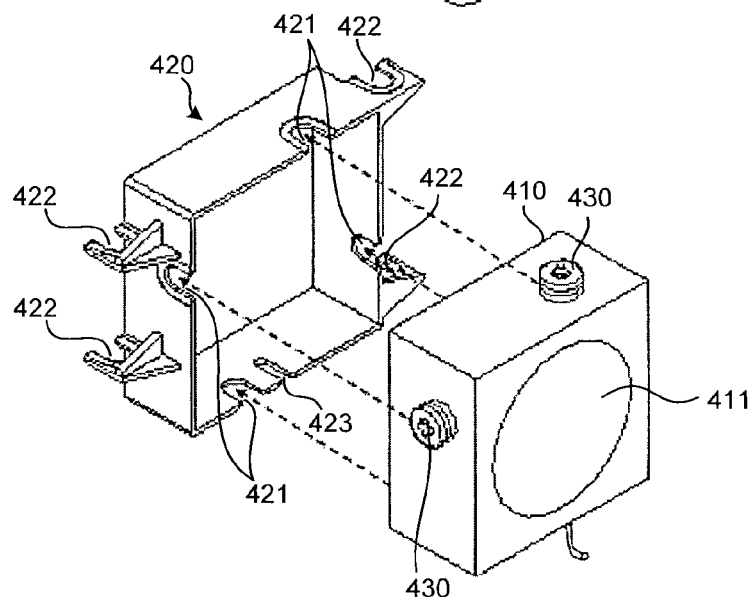
Figure 7C:
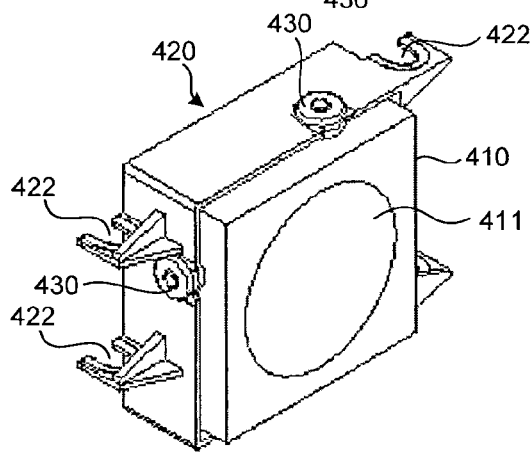

FIGS. 7A to 7C are diagrams for explaining the order in which the speaker 410, the speaker holder 420, and the elastic parts 430 are assembled. As illustrated in FIG. 7A, the respective bosses 412 formed on the speaker 410 are inserted into the respective holes 432 of the elastic parts 430. The boss 412 and the hole 432 have diameters of the size nearly equal to each other. This generates friction therebetween and thus prevents the elastic part 430 mounted on the speaker 410 from rotating about the boss 412, whereby the boss 412 engages with the hole 432.

As illustrated in FIG. 7B, the respective edges of the first slits 421 formed in the speaker holder 420 engage with their corresponding grooves 431 of the elastic parts 430 mounted on the speaker 410. The size of the first slit 421 is slightly larger than the size of the groove 431 of the elastic part 430. This helps fitting the respective first slits 421 into the grooves 431. The width of the groove 431 is nearly equal to the thickness of the side surface of the speaker holder 420, whereby the slits and the grooves engage with each other. FIG. 7C illustrates a state in which the speaker 410 is mounted on the speaker holder 420.

Figure 8A:
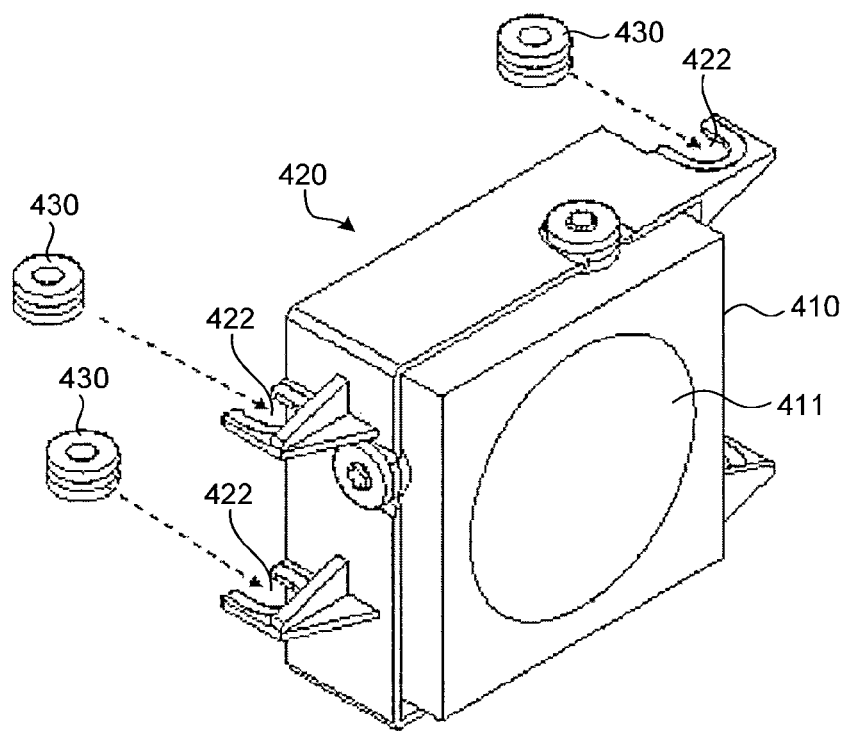
FIGS. 8A and 8B are views for explaining the order in which the speaker unit is assembled according to the embodiment.
Figure 8B:
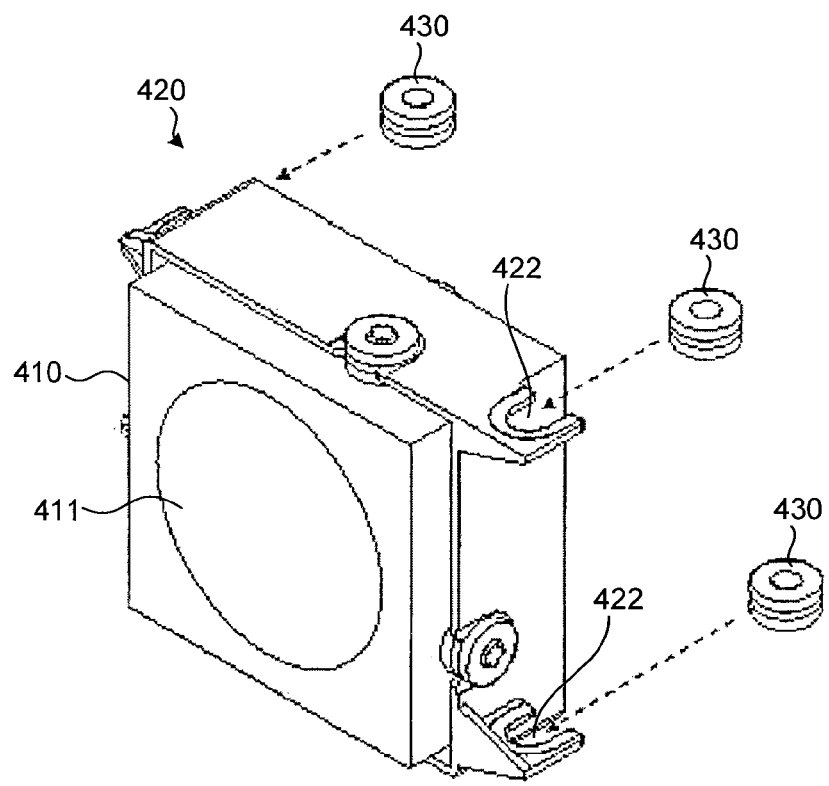

FIGS. 8A and 8B are diagrams for explaining the order in which the elastic parts 430 are mounted on the speaker holder 420. As illustrated in FIGS. 8A and 8B, the respective grooves 431 of the elastic parts 430 are fitted into the respective second slits 422 of the speaker holders 420. The elastic part 430 here is the same member as the elastic part 430 mounted on the speaker 410. This completes the speaker unit 40 including the speaker 410 and the speaker holder 420.

Figure 9A:
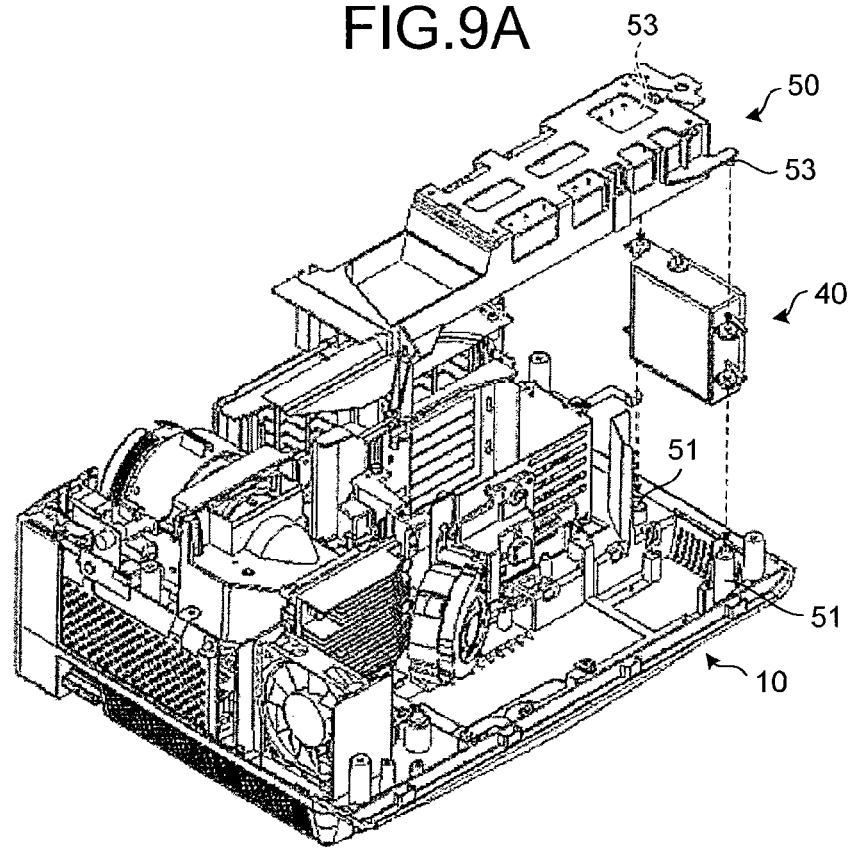
FIGS. 9A and 9B are diagrams for explaining the order in which the speaker unit is mounted according to the embodiment.
Figure 9B:
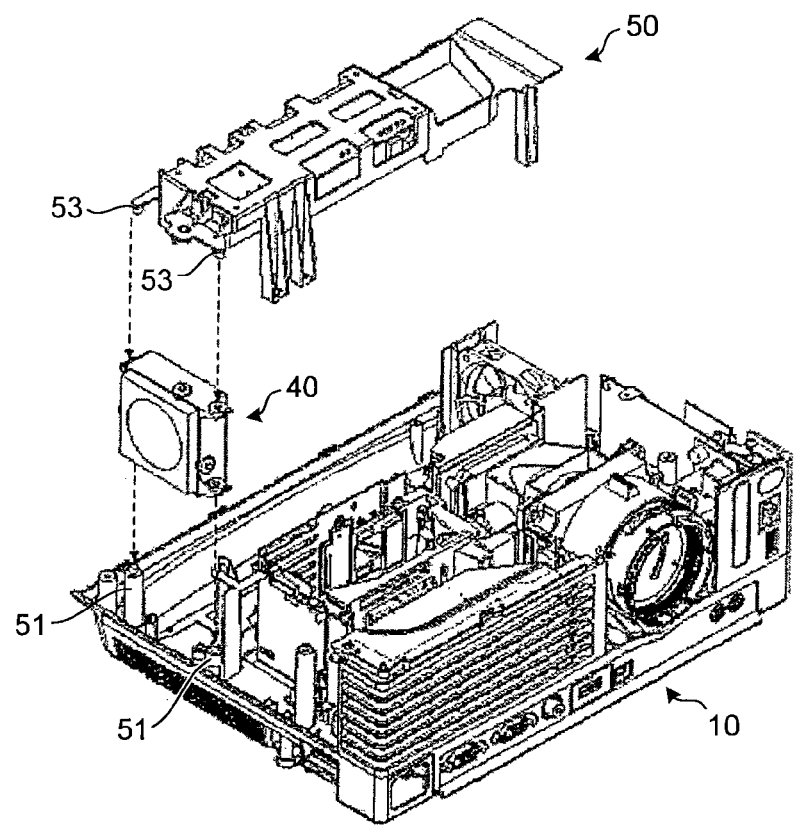

FIGS. 9A and 9B are perspective views illustrating a mode in which the speaker unit 40 is mounted on the main unit 10. In the main unit 10, two protruding portions 51 serving as a fourth mounting part are provided. The shape of the protruding portion 51 corresponds to that of the hole 432 of the elastic part 430. When mounting the speaker unit 40 on the main unit 10, the respective protruding portions 51 are firstly inserted into the respective holes 432 of the elastic parts 430 mounted on the second slits 422, whereby the second slits 422 and the protruding portions 51 engage with each other with the elastic parts 430 interposed therebetween. In addition, two protruding portions 53 serving as a fourth mounting part are also provided in a detachable housing unit 50. The housing unit 50 is mounted to the speaker unit 40 mounted on the main unit 10 so that the respective protruding portions 53 are inserted downward into the respective holes 432 of the elastic parts 430 mounted on the second slits 422. This causes the second slits 422 and the protruding portions 51 to engage with each other with the elastic parts 430 interposed therebetween. In this state, the speaker 410, the housing unit 50, and the main unit 10 do not come into contact with each other, whereby the vibration generated by the speaker 410 are not transmitted directly to the projector 1.

Figure 10A:
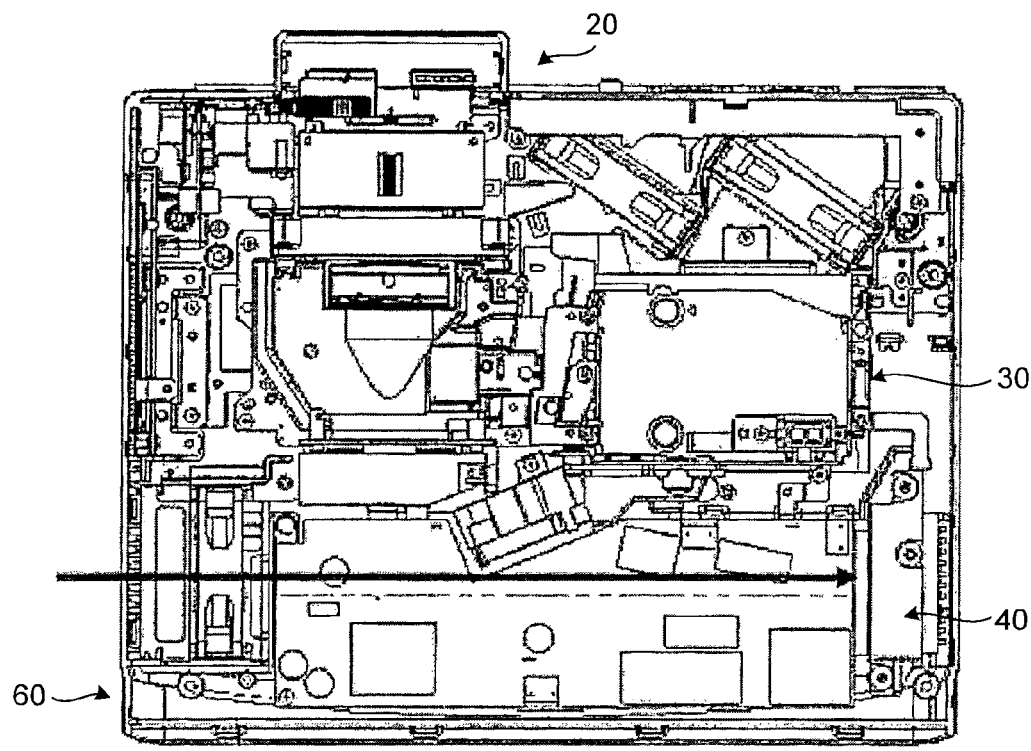
FIGS. 10A and 10B are diagrams illustrating the positional relation between the speaker unit and an air inlet according to the embodiment.
Figure 10B:
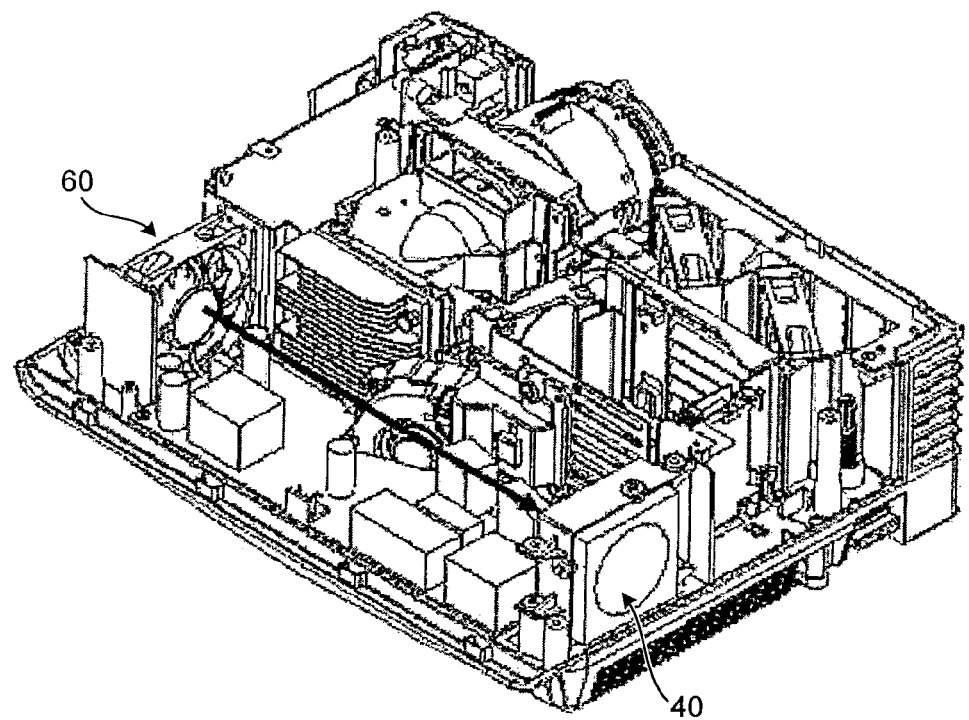

FIGS. 10A and 10B are diagrams illustrating the positional relation between an air inlet 60 and the speaker unit 40. As illustrated in FIGS. 10A and 10B, open air taken in by the air inlet 60 flows toward the speaker unit 40. In other words, the speaker unit 40 is provided on the downwind side of the air inlet 60.

With the mounting structure of the speaker according to the embodiment as described above, the speaker 410 and the speaker holder 420, and the speaker holder 420 and the main unit 10 are respectively fixed to each other with the elastic parts 430 interposed therebetween. The vibration generated in the speaker 410 is, therefore, absorbed in the elastic part 430 between the speaker 410 and the speaker holder 420, and the elastic parts 430 between the speaker holder 420 and the main unit 10. This suppresses the vibration caused by the speaker 410.

In addition, when mounting the elastic parts 430 to the speaker 410 or the speaker holder 420, the mounting is always achieved by inserting a part of the member included in the speaker 410 or the speaker holder 420 into each other. This does not require a screw or other members, thereby further suppressing the vibration.

Furthermore, with the mounting structure of the speaker according to the embodiment, the second slits 422 are formed in the parts extending from the speaker holder 420 for the purpose of mounting the speaker holder 420 to the main unit 10. This achieves the design of the position and the shape of the slits based on the shape of the main unit 10, thereby increasing the flexibility of the design.

Furthermore, with the mounting structure of the speaker according to the embodiment, the first slit 421 and the second slit 422 of the speaker holder 420 are formed in a direction in parallel with the direction of the sound emitted from the speaker 410. This effectively suppresses the vibration in the direction in which the loudest sound generated by the speaker 410 is emitted.

Furthermore, with the mounting structure of the speaker according to the embodiment, the speaker unit 40 is provided on the downwind side of the air inlet 60. This parallels the sound stream and the air stream, thereby suppressing degradation of the sound quality of the speaker due to the intake of air.

In place of the above-described structure, another structure may be used as follows: a slit is provided on the speaker and a protruding portion is provided on the speaker holder that engage with each other with an elastic member interposed therebetween. In addition, the shape of the elastic part may be changed based on the shape of the mounting part and the material of the elastic part and may be substituted with another material as long as it is capable of absorbing the vibration.

The present invention can provide the advantageous effect of suppressing vibration caused by a speaker.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
   a speaker;
   a speaker holder that holds the speaker;
   a main unit on which the speaker holder is mounted;
   a first mounting part formed on the speaker;
   a second mounting part formed on the speaker holder;
   a first elastic part that engages with both the first mounting part and the second mounting part;
   a third mounting part formed on the speaker holder;
   a fourth mounting part formed on the main unit; and
   a second elastic part that engages with both the third mounting part and the fourth mounting part, wherein
   the speaker and the main unit are provided in such a manner as not to come into contact with each other under a condition that the first mounting part and the second mounting part engage with the first elastic part, and the third mounting part and the fourth mounting part engage with the second elastic part.

2. The electronic device according to claim 1, wherein
   the first mounting part has a stick shape protruding perpendicular to the speaker,
   the second mounting part is a U-shaped slit formed in the speaker holder,
   the first elastic part includes a cylindrical body that has
     a hole formed along a central axis of the cylindrical body, and
     a groove formed along a circumferential direction on an outer circumferential surface of the cylindrical body, and
   the first mounting part is inserted into the hole of the first elastic part, and the second mounting part is inserted into the groove of the first elastic part.

3. The electronic device according to claim 1, wherein
   the third mounting part is a U-shaped slit formed in the speaker holder,
   the fourth mounting part has a stick shape protruding from the main unit,
   the second elastic part includes a cylindrical body that has
     a hole formed along a central axis of the cylindrical body, and a groove formed along a circumferential direction on an outer circumferential surface of the cylindrical body, and the fourth mounting part is inserted into the hole of the second elastic part, and the third mounting part is inserted into the groove of the second elastic part.

4. The electronic device according to claim 1, wherein the speaker holder has a wiring hole formed thereon, which serves as a guiding path for electrical wiring of the speaker, and the second mounting part is provided on each of the side surfaces opposite to each other of the speaker holder and at point-symmetric positions to each other with respect to a central point of a line that passes through the wiring hole in the speaker holder.

5. The electronic device according to claim 1, wherein the second mounting part is a U-shaped slit formed in the speaker holder, the third mounting part is a U-shaped slit formed in the speaker holder, and the U-shaped slit of the second mounting part and the U-shaped slit of the third mounting part open in opposite directions from each other.

6. The electronic device according to claim 1, wherein the second mounting part is a U-shaped slit formed in the speaker holder, the third mounting part is a U-shaped slit formed in the speaker holder, and each of the slits of the second mounting part and the third mounting part is formed perpendicular to a surface from which sound of the speaker is emitted.

7. An image projection apparatus comprising:
the electronic device according to claim 1.

8. The image projection apparatus according to claim 7, further comprising:

an air inlet that takes in open air, wherein a surface from which sound of the speaker is emitted is located on an downwind side of a stream of the open air taken by the air inlet.

* * * * *